US010614118B2

(12) United States Patent
He et al.

(10) Patent No.: US 10,614,118 B2
(45) Date of Patent: Apr. 7, 2020

(54) INCREASING INCLUSIVENESS OF SEARCH RESULT GENERATION THROUGH TUNED MAPPING OF TEXT AND IMAGES INTO THE SAME HIGH-DIMENSIONAL SPACE

(71) Applicant: MIcrosoft Technology Licensing, LLC, Redmond, WA (US)

(72) Inventors: Jia He, San Jose, CA (US); Ruofei Zhang, Mountain View, CA (US); Keng-Hao Chang, San Jose, CA (US); Xiaozong Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 15/908,755

(22) Filed: Feb. 28, 2018

(65) Prior Publication Data
US 2019/0266262 A1 Aug. 29, 2019

(51) Int. Cl.
*G06F 16/56* (2019.01)
*G06N 3/04* (2006.01)

(52) U.S. Cl.
CPC ............. *G06F 16/56* (2019.01); *G06N 3/04* (2013.01); *G06N 3/0445* (2013.01)

(58) Field of Classification Search
CPC ....... G06F 16/56; G06F 16/5854; G06N 3/04; G06N 3/0445
USPC .......................... 707/771; 382/154, 164, 244
See application file for complete search history.

(56) References Cited

U.S. PATENT DOCUMENTS

| 8,370,363 | B2 | 2/2013 | Wang et al. |
|---|---|---|---|
| 9,002,116 | B2 | 4/2015 | Lin et al. |
| 9,519,859 | B2 | 12/2016 | Huang et al. |
| 2010/0329548 | A1* | 12/2010 | Yoshimura ......... H04N 1/00278 382/164 |
| 2011/0085697 | A1 | 4/2011 | Clippard et al. |
| 2011/0302206 | A1 | 12/2011 | Lipson et al. |

(Continued)

OTHER PUBLICATIONS

"Beyond text queries: Searching with Bing Visual Search", Retrieved From <<https://blogs.bing.com/search-quality-insights/2017-06/beyond-text-queries-searching-with-bing-visual-search>>, Jun. 1, 2017, 7 Pages.

(Continued)

*Primary Examiner* — Dung K Chau
(74) *Attorney, Agent, or Firm* — Watson Patents, PLC; Vladan M. Vasiljevic

(57) ABSTRACT

Images are encoded into multidimensional vectors in a high-dimensional space utilizing an image model and textual content utilizing a text model. At least one of the image model and/or the text model are tuned such that the point within the multidimensional space pointed to by a vector encoded from an image is proximate to, as determined within the context of that multidimensional space, a point pointed to by a vector encoded from correlated textual content. Received images and textual content are encoded into image vectors and text vectors, respectively, and stored in an image graph and text graph, respectively. An input image can then be encoded as an input image vector and utilized to find close vectors in both the image graph and the text graph, thereby enabling an input image to be utilized to search textual content without using classifiers to deduce textual content therefrom.

20 Claims, 7 Drawing Sheets

(56) References Cited

U.S. PATENT DOCUMENTS

| | | | |
|---|---|---|---|
| 2012/0189211 A1 | 7/2012 | Luo et al. | |
| 2013/0182909 A1* | 7/2013 | Rodriguez-Serrano | ..................... G06K 9/34 382/105 |
| 2014/0095463 A1 | 4/2014 | Pappas | |
| 2015/0093017 A1* | 4/2015 | Hefeeda | .............. G06F 16/7847 382/154 |
| 2016/0306798 A1 | 10/2016 | Guo | |
| 2017/0061250 A1* | 3/2017 | Gao | .................... G06F 16/3347 |
| 2017/0132526 A1* | 5/2017 | Cohen | .................. G06N 3/0454 |
| 2017/0337271 A1 | 11/2017 | Lee et al. | |
| 2018/0084247 A1* | 3/2018 | Chang | ................ H04N 1/00005 |
| 2018/0089534 A1* | 3/2018 | Ye | ....................... G06K 9/00295 |
| 2018/0173996 A1* | 6/2018 | Lim | ...................... G06K 9/6293 |
| 2018/0232451 A1* | 8/2018 | Lev-Tov | ............. G06F 16/5854 |

OTHER PUBLICATIONS

"eCommerce search and navigation features", Retrieved From <<https://www.loop54.com/features/product-search-features-and-functions>>, Feb. 19, 2017, 7 Pages.

"Similar items: Rich products feature on Google Image Search", Retrieved From <<https://webmasters.googleblog.com/2017/04/similar-items-rich-products-feature-on.html>>, Apr. 10, 2017, 6 Pages.

Fang, et al., "From Captions to Visual Concepts and Back", In Proceedings of IEEE Conference on Computer Vision and Pattern Recognition, Jun. 8, 2015, 10 Pages.

Gratzl, et al., "LineUp: Visual Analysis of Multi-Attribute Rankings", In Journal of IEEE Transactions on Visualization and Computer Graphics, vol. 19, Issue 12, Oct. 13, 2013, 10 Pages.

He, Xiaodong, "Multimodal Learning for Image Captioning and Visual Question Answering", In Technical Report of MSR-TR-2016-16, Apr. 7, 2016, 50 Pages.

Huang, et al., "Learning Deep Structured Semantic Models for Web Search using Clickthrough Data", In Proceedings of 22nd ACM International Conference on Information & Knowledge Management, Oct. 27, 2013, 9 Pages.

Zeiler, et al., "Visualizing and understanding convolutional networks", In Proceedings of European Conference on Computer Vision, Sep. 6, 2014, pp. 818-833.

Khan, et al., "Neighborhood based fast graph search in large networks", In Proceedings of ACM SIGMOD International Conference on Management of Data, Jun. 12, 2011, pp. 901-912.

Yang, et al., "Visual Search at eBay", In Proceedings of 23rd ACM SIGKDD International Conference on Knowledge Discovery and Data Mining, Aug. 13, 2017, 10 Pages.

* cited by examiner

INCREASING INCLUSIVENESS OF SEARCH RESULT GENERATION THROUGH TUNED MAPPING OF TEXT AND IMAGES INTO THE SAME HIGH-DIMENSIONAL SPACE

BACKGROUND

As computing devices increasingly include cameras, and as a greater quantity of image content is available, searching utilizing an input image, as opposed to input query text, becomes more useful. However, current mechanisms of performing searches of exceptionally large volumes of digital content by computing devices are primarily text-based, with input queries being received in textual form. Where an input image is provided as the query, computer classification mechanisms are utilized to enable computing devices to recognize aspects of the image and convert the input image into textual content and then search utilizing traditional text-based searching. More specifically, trained computer classifiers are utilized to deduce textual content from images. Training classifiers, however, is difficult. The deduction of textual content from images often requires many classifiers, each of which can require tedious training that can quickly increase the scale of the aforementioned training difficulties. Moreover, errors in classification then further propagate through the system since the resulting textual content which forms the very basis of the search is wrong due to a classifier error or mis-classification. Furthermore, there are many instances in which classifiers have difficulty producing accurate results, such as instances where there are many different classifications that could be applied, sometimes referred to in the art as classification problems having large cardinality.

SUMMARY

Images can be encoded into multidimensional vectors in a high-dimensional space utilizing an image model. Likewise textual content can be encoded into multidimensional vectors in the same high-dimensional space utilizing a text model. At least one of the image model and/or the text model can be tuned such that the point within the multidimensional space pointed to by a vector encoded from an image can be proximate to, as determined within the context of that multidimensional space, a point pointed to by a vector encoded from correlated textual content. Received images and textual content can then be encoded into image vectors and text vectors, respectively, and stored in an image graph and text graph, respectively. Because of the aforementioned tuning, an input image can be encoded as an input image vector and can then be utilized to find close vectors in both the image graph and the text graph, where closeness can be determined within the multidimensional space common to both the text and image graphs. In such a manner, an input image can be utilized to search textual content without using classifiers to deduce textual content therefrom.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
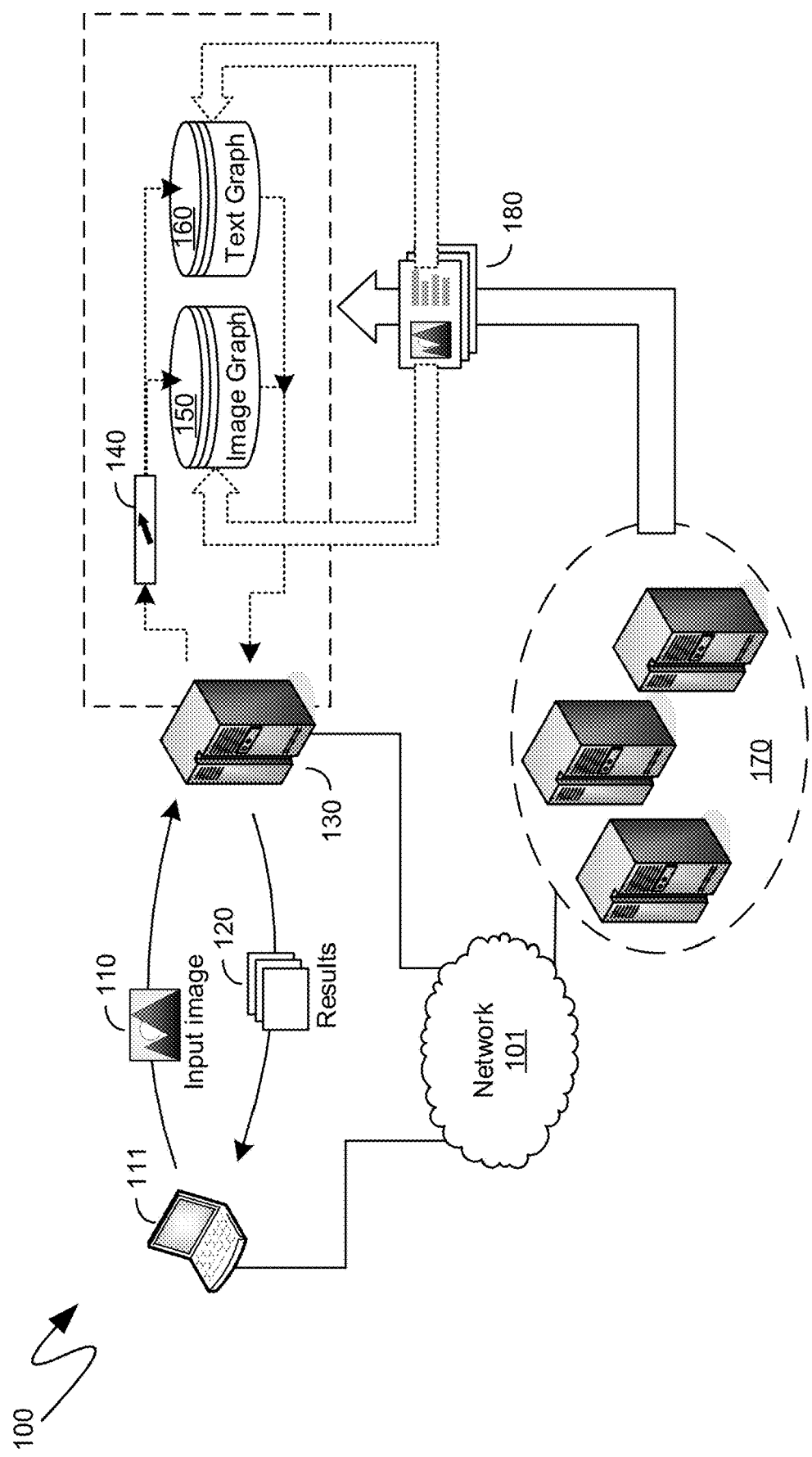
FIG. 1 is a system diagram of an exemplary system for increasing the inclusiveness of search results by mapping both text and images into the same multidimensional space.

The following description relates to the tuning of text models and/or image models utilized to encode textual content and images, respectively, into multidimensional vectors in a high-dimensional space such that the tuning results in a text model that encodes textual content into a vector that points to a point in the multidimensional space that is proximate to a point pointed to by a vector into which the image was encoded by the image model if the textual content and the image are correlated, thereby enabling input images to be encoded as input image vectors and utilized to directly search for close vectors, not only in a database of image vectors, but also in a database of text vectors. More specifically, at least one of the image model and/or the text model can be tuned such that the point within the multidimensional space pointed to by a vector encoded from an image can be proximate to, as determined within the context of that multidimensional space, a point pointed to by a vector encoded from correlated textual content. Received images and textual content can then be encoded into image vectors and text vectors, respectively, and stored in an image graph and text graph, respectively. Because of the aforementioned tuning, an input image can be encoded as an input image vector and can then be utilized to find close vectors in both the image graph and the text graph, where closeness can be determined within the multidimensional space common to both the text and image graphs. In such a manner, an input image can be utilized to search textual content without using classifiers to deduce textual content therefrom.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates an input image 110 being provided to one or more computing devices, such as the exemplary server computing device 130. The input image 110 is illustrated as being provided by an exemplary computing device 111, illustrated in the form of a laptop computing device. Such illustration is strictly to visually distinguish between a computing device providing the input image 110, and one or more computing devices providing responsive results, such as the exemplary results 120. In practical application, while the input image 110 may be provided by client computing devices, such as the illustrated laptop computing device, it is more likely that the input image 110 will be provided by one or more computing devices, of a set of computing devices, that in physical appearance and computing specifications are not dissimilar from the computing devices generating the exemplary results 120.

According to one aspect, upon receiving an input image 110, an image model can be utilized to convert the input image into an input image vector in a multidimensional space having a predefined dimensionality. An exemplary input image vector 140 is illustrated in the system 100 of FIG. 1 as having been generated from the input image 110. As utilized herein, the term "image vector" means a vector in a multidimensional space that is expressed in terms of numerical values, one for each dimension of the multidimensional space. The use of the adjective "image" only signifies that the image vector was generated based on the content of an image.

The image vector, such as exemplary image vector 140, can be generated from an image, such as exemplary image 110, by applying various operations to either portions of the image, to the image as a whole, or combinations thereof. Each dimension of the vector can be based on a predefined portion of the image, or the image as a whole, and can signify a particular aspect of the predefined portion of the image, or the image as a whole. For example, an image can be divided into equal portions, and each portion can be separately hashed, such as by applying a hash function to the numerical representations of the colors of the pixels of each portion of the image. The resulting hash values can be the values along particular dimensions of the vector, or can be inputs into further processing from which the individual dimension values of the vector are determined. Other dimensions of the vector can be representative of relationships between portions of the image, such as quantities of higher brightness pixels as compared with quantities of lower brightness pixels, or can be representative of aspects of the image, such as the suddenness between color transitions within the image. Other dimensions of the vector can be determined based upon tuned models, such as will be detailed further below, and may not be directly representative of an easily conceptualized visible aspect of the image.

With the image vector, such as the exemplary image vector 140, a search can be made within a database of other image vectors, such as the exemplary image graph 150, for vectors identifying coordinate points, within the multidimensional space, that are close, again, as measured within the multidimensional space, to the point, within the multidimensional space, identified by the exemplary image vector 140. For example, a nearest neighbor algorithm can be utilized that can identify the closest points within the multidimensional space by determining the square root of the sum of the squares of the differences, along each dimension of the multidimensional space, between the point, within the multidimensional space, identified by the exemplary image vector 140, and other points, within the multidimensional space, identified by other image vectors within the image graph 150.

Once identified, the closest vectors, within the image graph 150, to the image vector 140, can be utilized to find the corresponding images from which those closest vectors were generated utilizing an image model equivalent to the image model utilized to encode the input image 110 as the image vector 140. Such corresponding images can be stand-alone images, or they can be images that are part of text-image pairs. As utilized herein, the term "text-image pair" means a combination of: (1) a single image and (2) text corresponding to such an image. Such corresponding text can be descriptive of the image. For example, the corresponding text can comprise textual attributes of an item, object, and/or product pictured within the image. Thus, for example, a text-image pair can be an image of an individual and text identifying the individual by name, employee identification number, or any other like textual identifier. As another example, a text-image pair can be an image of a product and text providing attributes of the product, such as a manufacturer, a product name, a product size, or other like attributes of the product.

In addition to identifying images based on a closeness, in a multidimensional space, between vectors generated from such images and a vector generated from an input image, the vector generated from the input image, such as exemplary image vector 140, can also be utilized to search for closest vectors within a database of multidimensional vectors, having the same dimensionality as the image vector 140, except that these multidimensional vectors can have been generated from text, instead of images. More specifically, a text model can be utilized to generate a text vector from textual content. As utilized herein, the term "text vector" means a vector in a multidimensional space that is expressed in terms of numerical values, one for each dimension of the multidimensional space. The use of the adjective "text" only signifies that the text vector was generated based on textual content.

Text vectors can be generated from textual content by applying various operations to either portions of the text, to the text as a whole, or combinations thereof. Each dimension of the vector can be based on a predefined portion of text, or the text as a whole, and can signify a particular aspect of the predefined textual portion, or the text as a whole. For example, individual words of textual content can be separately hashed. As another example, groups of characters can be separately hashed, and textual characters can be grouped into such groups irrespective of word boundaries. For example, one mechanism can utilize a sliding window of a predetermined quantity of characters, such as three characters. Thus, in such an example, the word "RUNNING" could be divided up into the following groups of characters: "R-U-N", "U-N-N", "N-N-I", "N-I-N", and "I-N-G". Each group of characters could then be separately hashed. The individual hashes could then be generated into intermediate vectors, which could then be combined into a final vector, or "global vector". The text vector generated by such a text model could be the global vector itself, or, if the global vector is of a different dimensionality, the text vector can be the result of resampling the global vector into an appropriate dimensionality. Such a mechanism can be a specific implementation of a Convolutional Deep Semantic Similarity Model (CDSSM), such as will be detailed below, although other CDSSMs can, likewise, be utilized. In another example, an alternative mechanism can hash each word separately, and utilize the resulting hashes to form intermediate vectors. More specifically, each vector can be formed from a combination of the hash of the word and a prior vector, which, itself, was formed from a combination of the hash of that prior word, and a still prior vector. An initial vector can be a tunable parameter of such a mechanism. Additionally, such a mechanism can be operated bidirectionally, such that, in the reverse order, the prior vector being utilized as input into a current vector can be based on a word that occurs after the current word in the textual content. Such a mechanism can be a specific implementation of a Long Short Term Memory (LSTM) neural network, although other LSTM neural networks can, likewise, be utilized.

As will be detailed further below, one or more of the text model and/or the image model can be tuned such that the text vectors and image vectors being output by the text model and image model identify coordinate points, within the same multidimensional space, that are close to one another when the image that is encoded in the image vector corresponds to the text that is encoded in the text vector. Such tuning can then allow the image vector 140, obtained by encoding the input image 110, utilizing the image model, to be utilized to search for other vectors identifying close, within the same multidimensional space, coordinate points, not only in the image graph 150, but also in the text graph 160. In such an instance, the image vector 140 can be utilized to find similar images, even if those images are not associated with any text, or are associated with text that is poorly descriptive of the image or any items pictured within the image, as well as finding similar text, even if that text is not associated with any image, or is associated with a poorly formed image. Thus, the image vector 140 can be utilized to search, within the text graph 160, for vectors identifying coordinate points, within the multidimensional space, that are close, again, as measured within the multidimensional space, to the point, within the multidimensional space, identified by the exemplary image vector 140. For example, a nearest neighbor algorithm can be utilized that can identify the closest points within the multidimensional space by determining the square root of the sum of the squares of the differences, along each dimension of the multidimensional space, between the point, within the multidimensional space, identified with exemplary image vector 140, and other points, within the multidimensional space, identified by other text vectors within the text graph 160.

Once identified, the closest vectors, within the text graph 160, to the image vector 140, can be utilized to find the corresponding text from which those closest vectors were generated utilizing a text model. Such corresponding text can be standalone text, or it can be text that is part of text-image pairs, such as those detailed above. Once the text and images are identified from the searching of the image graph 150 and the text graph 160 with the same image vector 140, obtained from the input image 110, they can be amalgamated and at least a portion thereof can be provided as the results 120.

As illustrated in FIG. 1, the computing device providing the input image 110, such as the exemplary computing device 111, and the one or more computing devices generating the results 120, such as the exemplary server computing device 130, can be communicationally coupled to one another through a network, such as the exemplary network 101. Additionally, as also illustrated by the system 100 of FIG. 1, other computing devices, such as the server computing devices 170, can also be communicationally coupled to the same network 101. Such other server computing devices 170 can source images, text, and text-image pairs, such as the exemplary text-image pairs 180, which can be obtained by the one or more computing devices 130 and utilized to generate the vectors that comprise the databases illustrated as the image graph 150 and the text graph 160. More specifically, as illustrated in FIG. 1, images from the text-image pairs 180 can be encoded into vectors by utilizing an image model, such as that detailed herein, and textual content from the text-image pairs 180 can be encoded into vectors by utilizing a text model, such as that detailed herein. The resulting image vectors can be stored in the database illustrated as the image graph 150, and the resulting text vectors can be stored in the text graph 160, thereby providing the relevant content to be searched, such as by utilizing an input image vector 140, as detailed herein.

Accordingly, the exemplary system 100 of FIG. 1 provides search results, such as exemplary results 120, based on an input image, such as exemplary input image 110, that are more inclusive since they are formed from utilizing the input image to search both images and text that have both been separately converted, using image models and text models, respectively, that have been tuned to map corresponding text and images to proximate points within a multidimensional space, where the proximity of such points is determined in the context of the multidimensional space. Such increased inclusiveness allows the exemplary system 100 of FIG. 1 to be utilized in a number of practical environments. For example, the exemplary system 100 can be utilized to more easily locate mechanical parts, where text-image pairs of mechanical parts, comprising an image of the mechanical part and textual attributes thereof, can be obtained, such as from the server computing devices 170, and then individuals seeking to locate a particular part can search for such a part based on an input image, such as the exemplary input image 110, which can have been taken by such individuals, such as by their cell phone, of an existing part that they seek to replace with a new part. As another example, the exemplary system 100 can be utilized to identify content that is relevant to an input image, with such content being in the form of text-image pairs obtained from computing devices communicationally coupled to the network 101. As yet another example, the exemplary system 100 can be utilized to automatically generate text corresponding to an input image, such as text that is descriptive of the input image, and object pictured within the input image, or which provides textual attributes of such an object. Such automatically provided textual content can then be utilized to further catalog, or otherwise process, images, such as the exemplary input image 110, that were obtained without corresponding textual description or attributes. Alternatively, or in addition, such automatically provided textual content can be utilized to double check, or verify, textual descriptions or attributes provided with an input image, such as exemplary input image 110.

Figure 2:
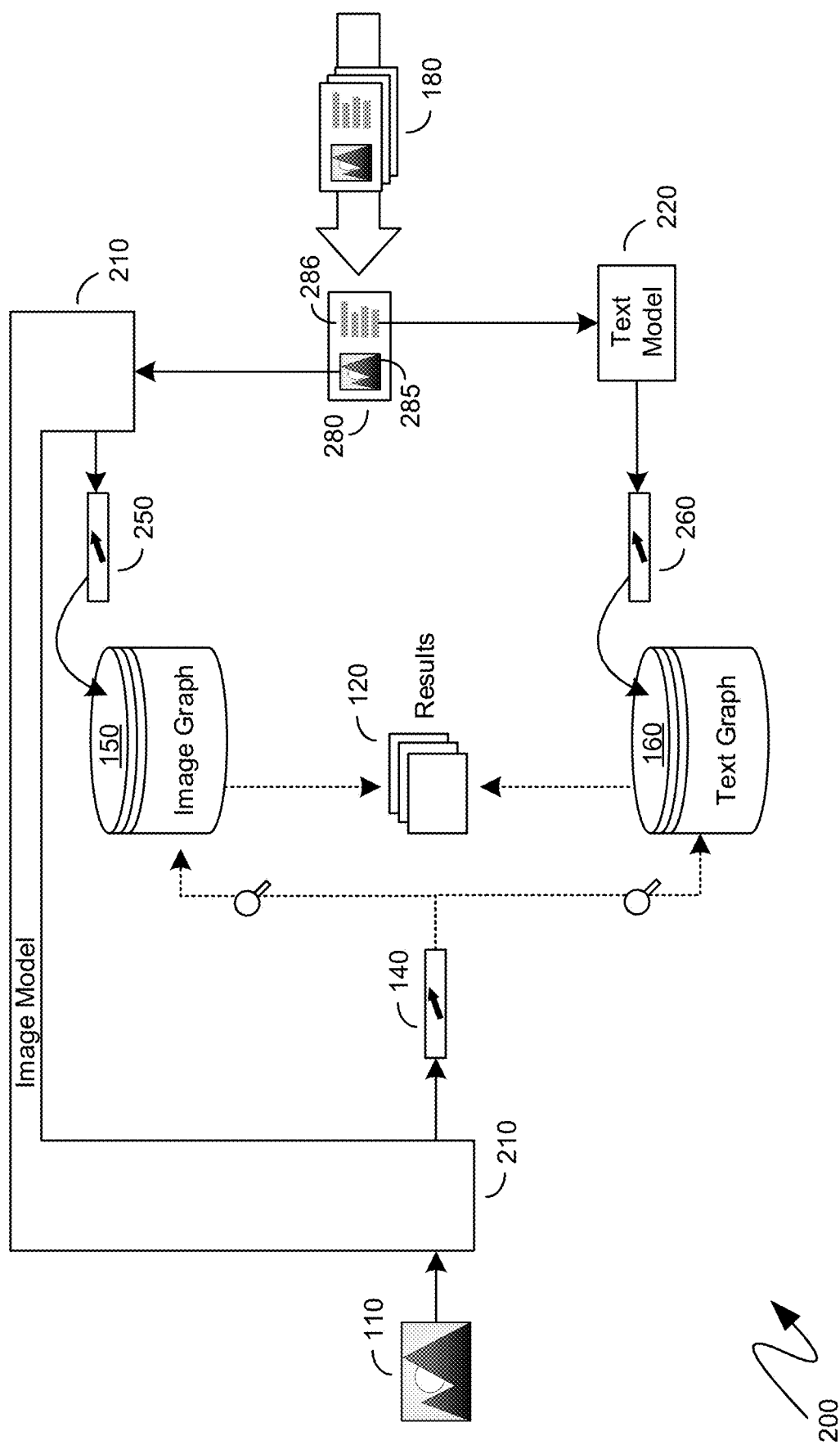
FIG. 2 is a block diagram of an exemplary system for increasing the inclusiveness of search results by mapping both text and images into the same multidimensional space.

With reference to FIG. 2, a block diagram 200 illustrates an exemplary process by which databases of vectors, such as the aforementioned image graph 150 and text graph 160, can be maintained, updated, and utilized to provide results responsive to an input image, such as the exemplary input image 110. As shown, the exemplary input image 110 can be received and processed according to an image model, such as exemplary image model 210, to generate an input image vector, such as the exemplary input image vector 140. Separately, a content flow comprising multiple text-image pairs, such as exemplary text-image pairs 180, can be continuously received. For each text-image pair in the exemplary text-image pairs 180, such as the exemplary text-image pair 280, the image, such as exemplary image 285, can be processed according to the same image model 210 to generate an image vector, such as the exemplary image vector 250. Concurrently, the textual content 286 of the exemplary text-image pair 280 can be processed according to a text model, such as exemplary text model 220, to generate a text vector 260. For each of the text-image pairs, such as the exemplary text-image pair 280, from the content flow, a corresponding image vector and text vector can be generated. As will be detailed further below, one or more of the text model 220 and/or image model 210 can be tuned so that for a single text-image pair, such as exemplary text-image pair 280, the image vector 250, resulting from the image 285 of such a text-image pair 280 can identify a coordinate point within a multidimensional space that is proximate, within the multidimensional space, to a coordinate point identified by the text vector 260 resulting from the textual contents 286 of that text-image pair 280. The resulting image vectors and text vectors from such processing of a content flow can be stored as part of the image graph 150 and text graph 160, respectively.

The input image vector 140 can then be utilized to search the databases for vectors identifying coordinate points, within the multidimensional space, that are proximate to, as determined within the context of the multidimensional space, the coordinate point identified by the input image vector 140. For example, as detailed above, a nearest neighbor algorithm, or other like mechanism by which distance, in the multidimensional space, between the coordinate point identified by the input image vector 140 and other coordinate points identified by other image vectors within the image graph 150, can be utilized to identify the image vectors, from the image graph 150, that identify coordinate points that are closest, as determined within the context of the multidimensional space, to the coordinate point identified by the input image vector 140. Such identified image vectors can then be utilized to obtain the corresponding images from which such image vectors were encoded, and such images, or corresponding text-image pairs, can be processed to obtain the results 120. Concurrently, in a similar manner, the input image vector 140 can be utilized to search the text graph 160, even though the input image vector 140 was encoded from an image, while the vectors that are part of the text graph 160, such as the exemplary text vector 260, were encoded from textual content. For example, as detailed above, and nearest neighbor algorithm, or other like mechanism by which distance, in the multidimensional space, is determined, can be utilized to identify text vectors that identify coordinate points that are proximate to, as determined within the context of the multidimensional space, the coordinate point identified by the input image vector 140. Such identified text vectors can then be utilized to obtain the corresponding textual content from which such text vectors were encoded, and such textual content, or the corresponding text-image pairs, can be processed to obtain the results 120.

According to one aspect, amalgamating the text-image pairs identified by searching the image graph 150 with the text-image pairs identified by searching the text graph 160 can comprise a removal of duplicate text-image pairs. According to another aspect, amalgamating the text-image pairs can comprise sorting the text-image pairs based on the distance, within the multidimensional space, between the coordinate point identified by the input image vector 140 and the coordinate points identified by the text or image vectors encoded from the textual content, or image, respectively, of the text-image pairs. According to yet another aspect, amalgamating the text-image pairs can comprise filtering the text-image pairs, such as by applying a threshold minimum distance, within the multidimensional space, between the coordinate point identified with the input image vector 140 and the coordinate points identified by the text or image vectors encoded from the textual content, or image, respectively, of the text-image pairs.

Once generated, the results, such as the exemplary results 120, can be returned as output responsive to the input image, such as exemplary input image 110. While the results 120 can be a collection of text-image pairs, sorted and/or filtered, such as in the manner detailed above, in other aspects the results, such as the exemplary results 120, can take other forms. For example, the results 120 can be one or more textual attributes that are deemed to be relevant to, or descriptive of, the input image 110. More specifically, the text-image pairs identified by searching the image graph 150, and the text-image pairs identified by searching the text graph 160, can, together, comprise multiple textual descriptions, from each of the identified text-image pairs, and each textual description can include one or more attributes. The frequency with which an individual attribute occurs within those textual descriptions can be utilized to "vote" for such an attribute. Correspondingly, the results, such as the exemplary results 120, can be the attributes receiving the highest quantity, or frequency, of votes. Such results can then represent the attributes determined, by the aforedescribed mechanisms, and without the need to train classifiers, to be relevant to the input image 110. The determined attributes can be based on total quantities of votes, or they can be based on the quantities of votes from specific text-image pairs, such as the top-ranked text-image pairs, where such rankings can be based on the distance in the multi-dimensional space, described above.

According to one aspect, the results 120 can include a subset of the text-image pairs identified in the manner detailed above. For example, if the input image 110 depicted a mechanical part, the exemplary results 112 can comprise text-image pairs that can include images showing equivalent or replacement parts together with textual content describing such parts, or providing attributes thereof, such as dimensions, specifications, compatibility with other equipment, and the like. According to another aspect, the results 120 can include textual content deemed to be attributes of, descriptive of, or otherwise relevant to the input image 110 or an item pictured in the input image 110. For example, the input image 110 can be an image of a mechanical part, and the results 120 can be textual content describing the part, such as dimensions, specifications, compatibility with other equipment, and the like. Such textual content can have been obtained from text-image pairs which, due to the mechanisms described herein, are deemed to be similar to the input image 110. Consequently, textual content from such text-image pairs can be deemed to be relevant to, or responsive to, the input image 110.

Figure 3:
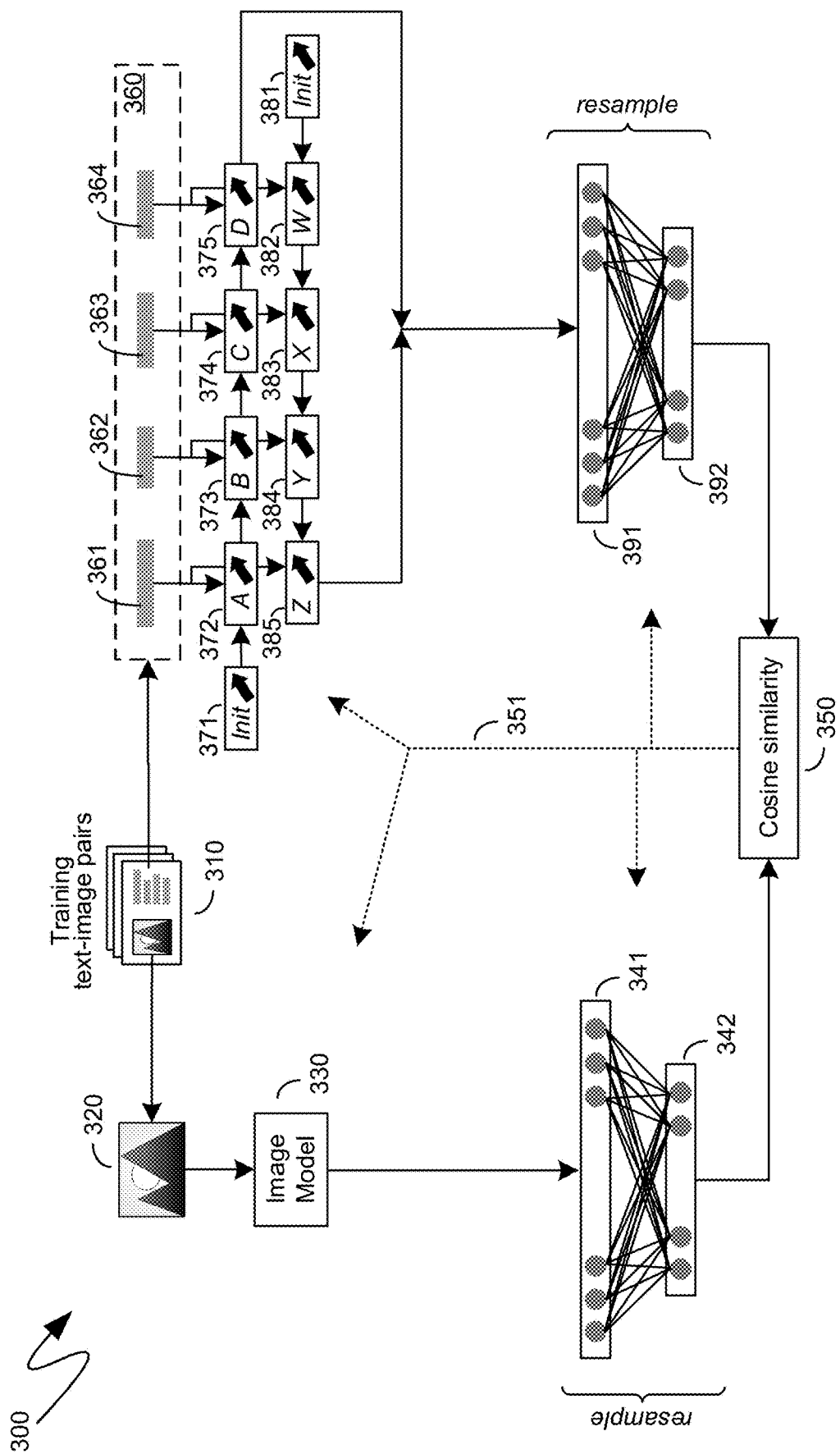
FIG. 3 is a block diagram of an exemplary tuning of mappings of text and images into the same multidimensional space.

Turning to FIG. 3, the system 300 illustrates one mechanism for tuning one or more of the text model 220 and/or the image model 210 shown in FIG. 2 so that corresponding images and textual content are encoded into multidimensional vectors, having equivalent dimensionality, and identifying coordinate points, in the multidimensional space, that are proximate to one another as determined within the context of such a multidimensional space. In the exemplary system 300 shown in FIG. 3, greater detail is provided for the textual model. However, it is meant to be understood that equivalent mechanisms can equally be applied within the context of the image model and that such equivalent mechanisms are not illustrated only to avoid duplication and difficulty of visual presentation. Additionally, while an LSTM neural network is illustrated in the exemplary system 300 shown in FIG. 3, analogous mechanisms can be applied to other forms of neural networks, such as the aforedescribed Convolutional Deep Semantic Similarity Model (CDSSM) neural network.

As shown in FIG. 3, tuning of one or more of the text model and/or the image model can be performed with reference to one or more training text-image pairs, such as the exemplary text-image pairs 310. Training text-image pairs can be text-image pairs for which the image and corresponding textual content have been verified to be correctly associated. For purposes of illustrating such tuning, an image 320 from a single one of such training text-image pairs 310 is illustrated separately from its text-image pair, as is the corresponding textual content 360 that corresponds to such an image 320. In accordance with LSTM neural network mechanisms, each word of the textual content 360, such as the exemplary words 361, 362, 363 and 364, can be separately hashed or otherwise encoded into vectors. Each resulting vector, however, can include information from a prior vector. Thus, for example, as shown in FIG. 3, an intermediate vector 373 obtained by encoding the second word 362 can also include information from the intermediate vector 372 that corresponds to the first word 361. The first word 361 can be encoded into an intermediate vector 372 based on the word 361 itself and an initial vector 371. Such an initial vector 371 can be a tunable parameter of the LSTM neural network, since its selection influences the subsequent intermediate vectors, namely intermediate vector 372 (encoded from the initial vector 371 and the first word 361), intermediate vector 373 (encoded from the prior intermediate vector 372 and the second word 362), intermediate vector 374 (encoded from the prior intermediate vector 373 and the third word 363) and intermediate vector 375 (encoded from the prior intermediate vector 374 and the fourth word 364). Additional tunable parameters include the parameters that control the manner in which each prior vector is merged into a subsequent vector. Thus, for example, the obtaining of the intermediate vector 373, by merging of the encoding of the second word 362 and the intermediate vector 372, can be preformed in accordance with one or more tunable parameters. Such parameters can be the same as those influencing the merging of other encoded words with other prior vectors, or each intermediate vector can be the result of merging an encoded word with a prior vector according to individually tunable parameters.

An LSTM neural network mechanism can also operate bidirectionally. Thus, as illustrated in FIG. 3, additional intermediate vectors can be generated from the words 361, 362, 363 and 364, except that such intermediate vectors can depend on the intermediate vector of the word subsequent to the current word, as opposed to the word prior to the current word. For example, the intermediate vector 384, generated from the second word 362 can additionally include, not the intermediate vector 385 of the first word 361, but rather the intermediate vector 383 of the third word 363. In such an operation, an initial vector, such as the exemplary initial vector 381, can be provided as input to the generation of the intermediate vector 382 from the last word 364. Each subsequent intermediate vector, namely the intermediate vectors 383, 384 and 385 can be generated from intermediate vectors associated with subsequent (as opposed to prior) words, with the terms "subsequent" and "prior" referencing the order of the words of the textual content 360 as they would normally be read in a left-to-right manner.

According to one aspect, the last intermediate vector in one direction, such as, for example, the intermediate vector 375 shown in FIG. 3, can be combined with the last intermediate vector in the opposite direction, such as, for example, the intermediate vector 385, to form a global vector, such as the exemplary global vector 391. The global vector 391 may have a greater quantity of dimensions than the multidimensional space for which the tuning is being performed. Consequently, the global vector 391 can be remapped into a vector 392 having a smaller dimensionality. Such a vector 392 can be the text vector generated from the textual content 360 utilizing a current version of the text model.

The manner in which such a remapping takes place can be another parameter of the text model that can be tuned. More specifically, the resulting text vector 392 can be compared with an image vector 342 that can be generated by an image model 330. According to one aspect, such a comparison can be a cosine similarity, such as the exemplary cosine similarity 350 shown in the system 300 of FIG. 3. A cosine similarity can be agnostic as to the magnitude of two vectors, and can compare only the angle between them, in a multidimensional space, with the value of the cosine of the angle between the two vectors, again, in the multidimensional space, approaching a value of one as the two vectors converge.

Thus, according to one aspect, the parameters of, for example, the text model can be tuned to attempt to maximize the cosine similarity 350. For example, the initial intermediate vectors 371 and 381 can be changed to drive the text vector 392 closer to the image vector 342. As another example, the manner in which the resampling of the global vector 391 into the text vector 392 is performed can, likewise, be tuned to maximize the cosine similarity 350. Such a feedback loop is illustrated by the dashed arrows 351 in the exemplary system 300 of FIG. 3.

Additionally, or alternatively, the image model 330 can be tuned. Like the text model, the image model can utilize a CDSSM neural network, an LSTM neural network, or other types of neural networks. Likewise, the image model 330 can comprise the generation of a global vector, such as the exemplary global vector 341, which can be of a higher dimensionality than the multidimensional space within which the text and image vectors of corresponding textual content and images are to overlap. In such an instance, a resampling can be performed to reduce the dimensionality of the vector 341 into the reduced dimensionality vector 342, which can be the image vector to which the previously described text vector 392 is compared by the cosine similarity 350. Thus, tuning can modify parameters of the image model 330 or the resampling, as also shown by the dashed arrows 351 of the system 300 of FIG. 3.

Various feedback loops can be utilized to tune the parameters described. For example, one tuning can seek to maximize a cosine similarity for a single training text-image pair before proceeding to a subsequent text-image pair. As another example, another tuning can seek to maximize a cosine similarity for a defined set or group of training text-image pairs as a whole, instead of any single text-image pair in particular. Other variations on singular, local or global maxima can, likewise, be utilized.

Figure 4:
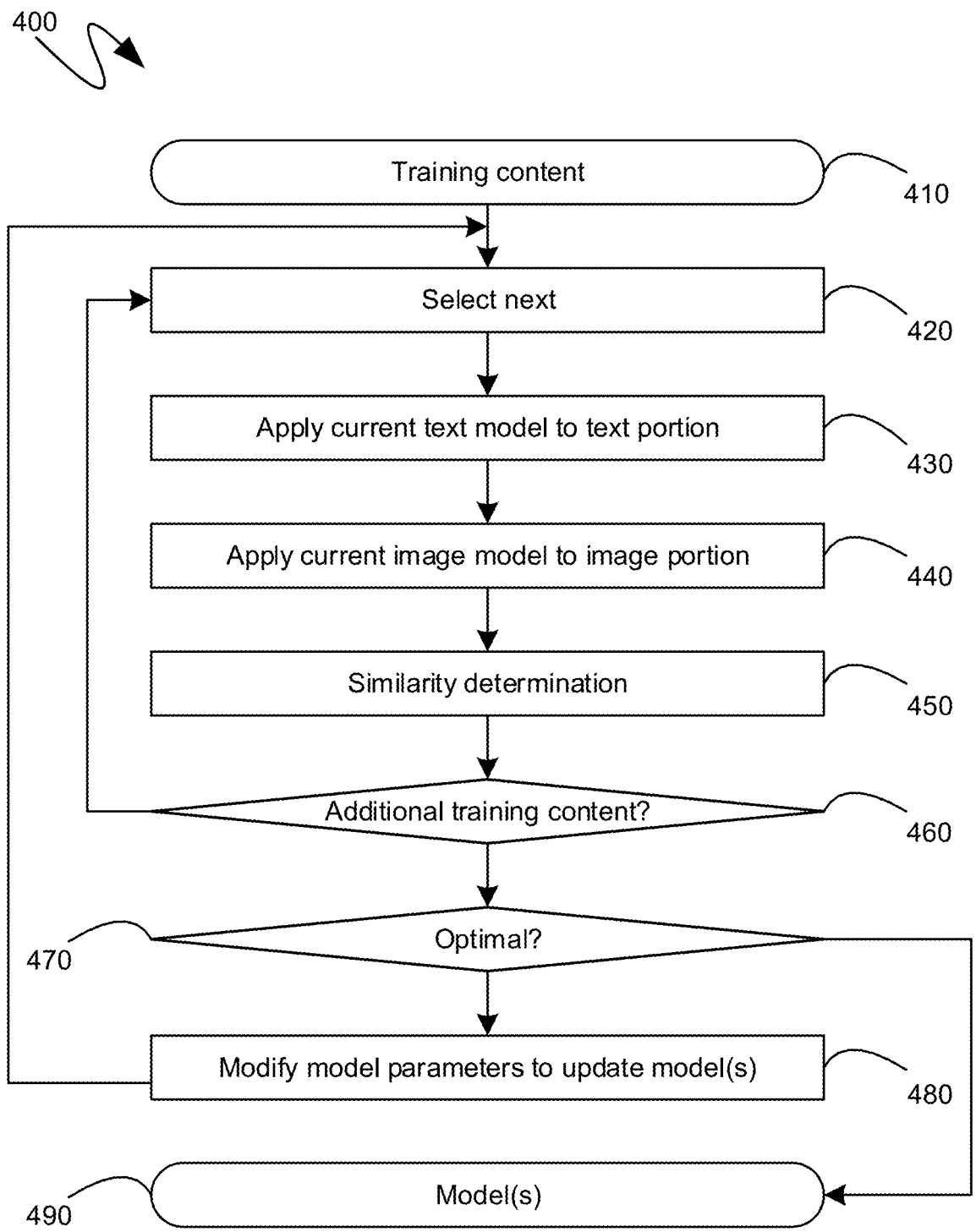
FIG. 4 is a flow diagram of an exemplary series of steps by which mappings of text and images into the same multidimensional space can be tuned.

Referring to FIG. 4, the flow diagram 400, illustrates an exemplary sequence of steps by which the aforedescribed tuning can be performed. Initially, training content, such as the training text-image pairs described previously, can be received or otherwise obtained at step 410. A specific one of the training text-image pairs can be selected at step 420. Subsequent to the selection of a specific training text-image pair at step 420, the image portion can be encoded into an image vector by a current image model and the text portion can be encoded into a text vector by a current text model. The encoding of the image portion into an image vector can be performed at step 440, while the encoding of the text portion into a text vector can be performed at step 430. A similarity determination between the text vector generated at step 430 and image vector generated at step 440 can be made at step 450. As described previously, such a determination can be a cosine similarity or other like vector similarity measurement or quantification.

At step 460 a determination can be made as to whether the tuning will be performed on a per text-image pair basis, or on multiple ones of the training text-image pairs together. If the latter, than processing can loop back to step 420 and select another training text-image pair. Once step 460 determines that a sufficient quantity of text-image pairs have been processed, processing can proceed to step 470 and a determination can be made as to whether tuning of the parameters of one or more of the text model and/or the image model will be performed. If, at step 470, it is determined to tune such parameters, then modified parameters can be selected at step 480 and processing can return to step 420 to repeat steps 420 through 460 for the current text model and/or image model with the modified parameters. If such modified parameters result in a greater similarity, as determined at step 450, then they can be retained and the prior parameters discarded. Such a process can then repeat, incrementally updating and improving the parameters until, at step 470, it is determined that further modifications should not be performed, in which case the last-used parameters can be utilized as the parameters of the text model and/or the image model, as indicated by step 490.

Figure 5:
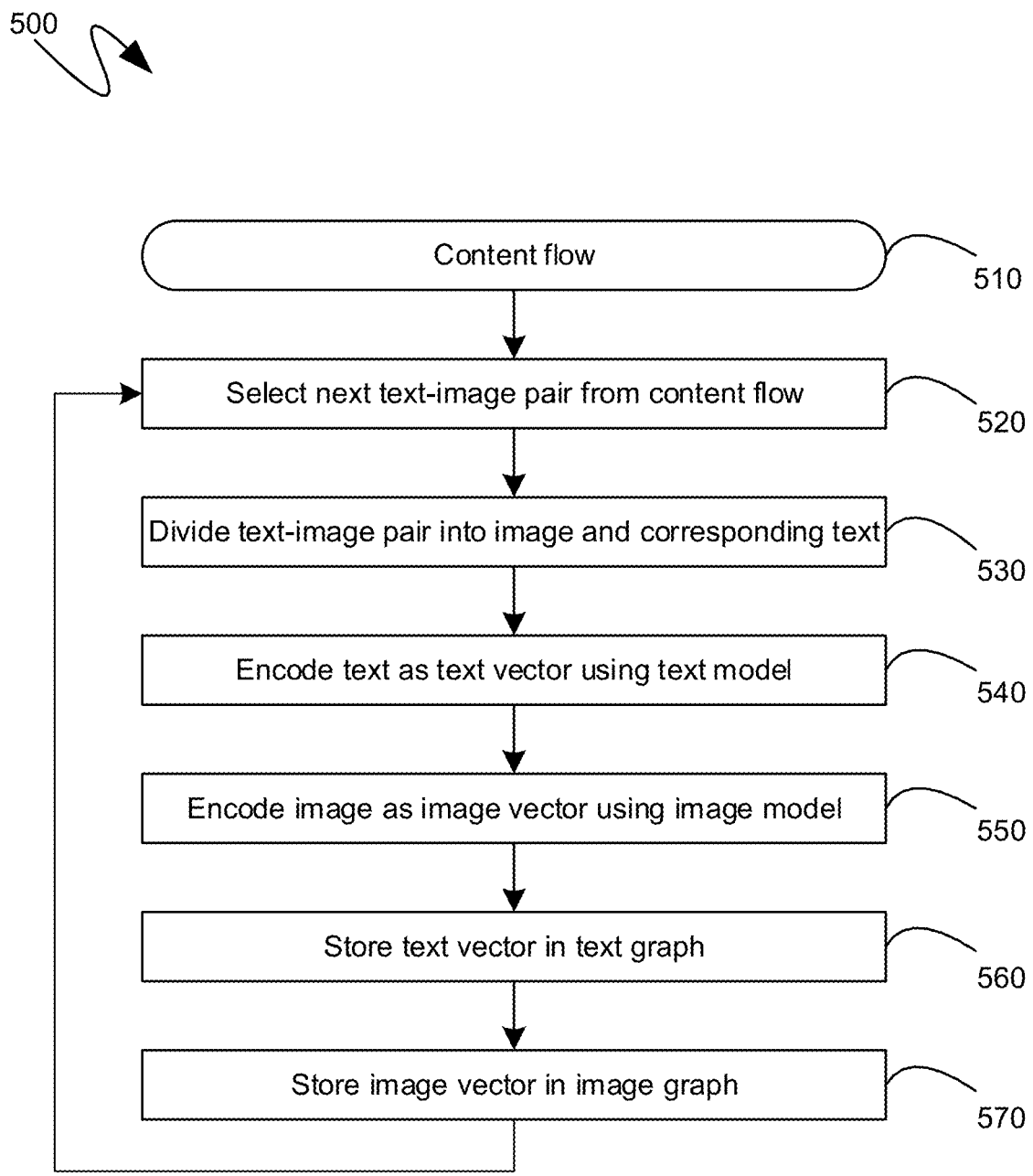
FIG. 5 is a flow diagram of an exemplary series of steps by which received text-image pairs can be processed.

Referring to FIG. 5, the flow diagram 500 shown therein illustrates an exemplary sequence of steps by which a content flow can be processed for subsequent searching by an input image. Initially, at step 510, the content flow, representing, for example, multiple text-image pairs, can be continuously received. At step 520, an unprocessed text-image pair can be selected from the content flow for subsequent processing. At step 530, then, the text-image pair selected at step 520 can be divided into an image and corresponding textual content. Subsequently, at step 540, the textual content can be encoded as a text vector using a text model, such as in the manner detailed above. Concurrently with step 540, or subsequent to step 530, irrespective of the performance of step 540, at step 550, the image of the text-image pair selected at step 520, can be encoded as an image vector using an image model, such as in the manner detailed above. Subsequent to the generation of the text vector at step 540, such as at step 560, the generated text vector can be stored in a database, referred to herein as a "text graph", together with the other generated text vectors from other text-image pairs received from the content flow of step 510. Analogously, subsequent to the generation of the image vector at step 550, the image vector can be stored in a database, referred to herein as a "image graph", together with other generated image vectors from other text-image pairs received from the content flow step 510. Processing can then return to step 520 to select another unprocessed text-image pair from the content flow.

Figure 6:
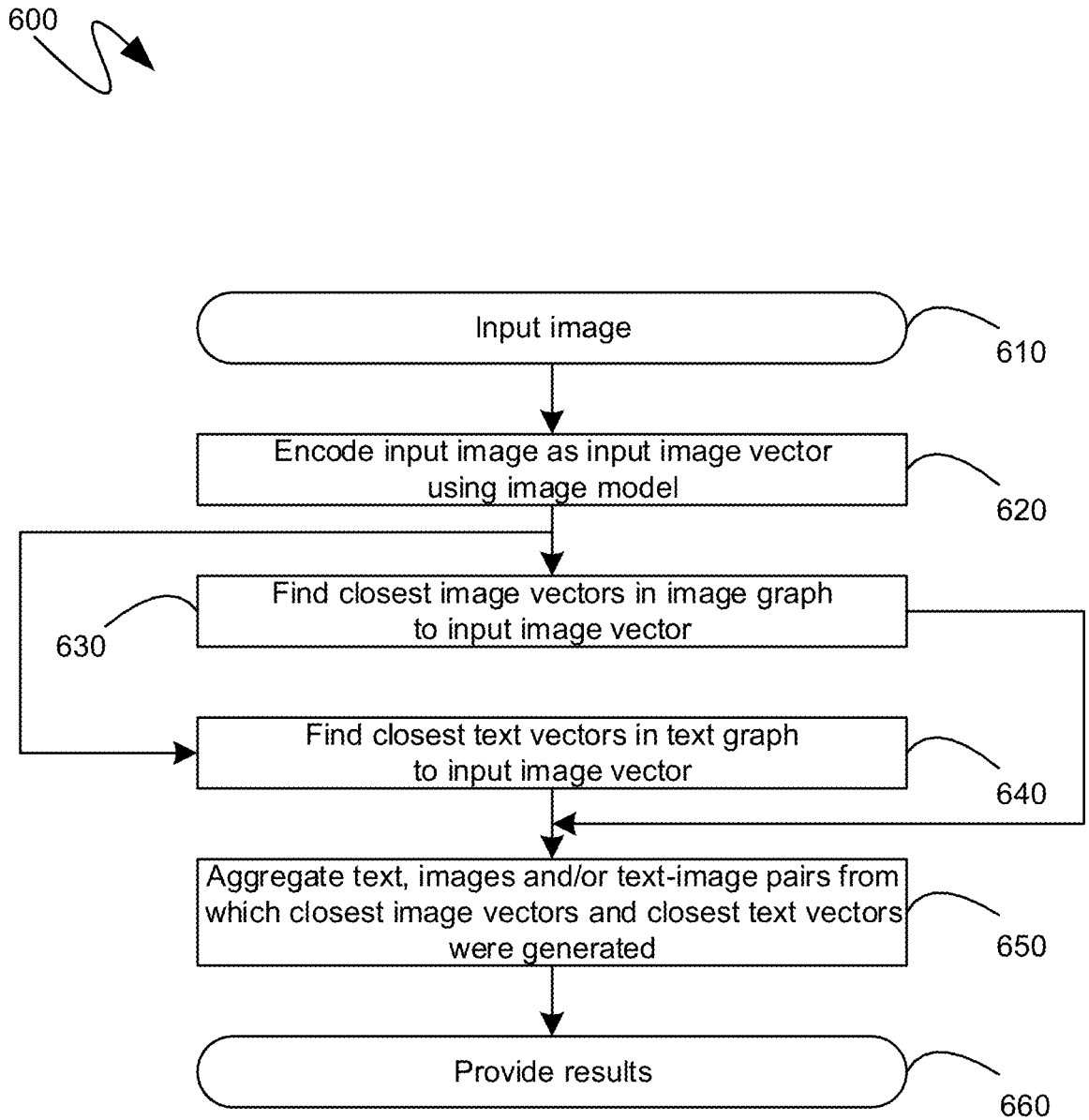
FIG. 6 is a flow diagram of an exemplary series of steps by which a received input image can be utilized to search both text and image databases in a same multidimensional space.

Referring to FIG. 6, the flow diagram 600 shown therein illustrates an exemplary sequence of steps by which search results having increased inclusiveness can be provided in response to an input image. Initially, at step 610, the input image can be received, such as through computer network communications received from another computing device through a computing network to which both the computing device providing the input image, and the computing device executing the steps of the flow diagram 600, are communicationally coupled. Subsequently, at step 620, the input image received at step 610 can be encoded as an input image vector utilizing an image model, such as in the manner detailed above. Subsequent to step 620, either concurrently, or consecutively, steps 630 and 640 can be performed. Step 630 can comprise the finding of other vectors, within the image graph, that identify coordinate points, within a multidimensional space, that are proximate to, as determined within the context of the multidimensional space, the coordinate point identified by the input image vector. As detailed previously, the determination of closeness, within the context of the multidimensional space, can include the determination of a square root of the sum of the squares of the differences, along each dimension of the multidimensional space, between the coordinate point identified by the input image vector and any other coordinate point identified by any other image vector. Algorithms, such as the well-known nearest neighbor algorithm, can be utilized to perform step 630. Step 640 can comprise the findings of other vectors within the text graph, that identify coordinate points, within a multidimensional space, that are proximate to, as determined within the context of the multidimensional space, to the coordinate point identified by the input image vector. Equivalent mechanisms to those described above with respect to 630 can equally be utilized at step 640.

Subsequently, at step 650, the results obtained from steps 630 and 640 can be aggregated. For example, the vectors identified at steps 630 and 640 can be utilized to identify the corresponding images and textual content from which such vectors were generated. Such images, from which the identified image vectors were encoded, can include images that are unaffiliated with textual content, and images that are part of text-image pairs. Likewise, such textual content, from which the identified text vectors were encoded, can include textual content that is unaffiliated with an image, and textual content that is part of text-image pairs. Consequently, at step 650, as part of the aggregation, duplicate text-image pairs can be removed, the filtering can be applied to eliminate other identified textual content, images, or text-image pairs, including, for example, establishing a minimum relevance threshold that can be based on a distance, in the multidimensional space, between vectors encoded from such images or textual content and the input image vector, and other like aggregation. At step 660 the resulting information can be returned in response to the input image received at step 610. According to one aspect, the results provided at step 660 can include text-image pairs identified at steps 630 and 640 and aggregated at step 650. According to another aspect, the results provided at step 660 can include textual content deemed to be attributes of, descriptive of, or otherwise relevant to the input image 610 or an item pictured in the input image 610. For example, the results provided at step 660 can be textual attributes of the text-image pairs identified at steps 630 and 640 and aggregated at step 650, with such textual attributes being provided at step 660 as the textual attributes of the product or item depicted by the input image received at step 610. Again, as detailed above, the aggregation, at step 650, can include a voting of particular attributes based on a frequency or other like quantification of the occurrence of such attributes in the text-image pairs identified at steps 630 and/or 640. In such a manner, the results provided at step 660, because they are based on a searching of both an image graph and the text graph with an input image vector can be more inclusive than results generated simply by searching content of a same type as that provided by the input, namely, in the present example, image content.

Figure 7:
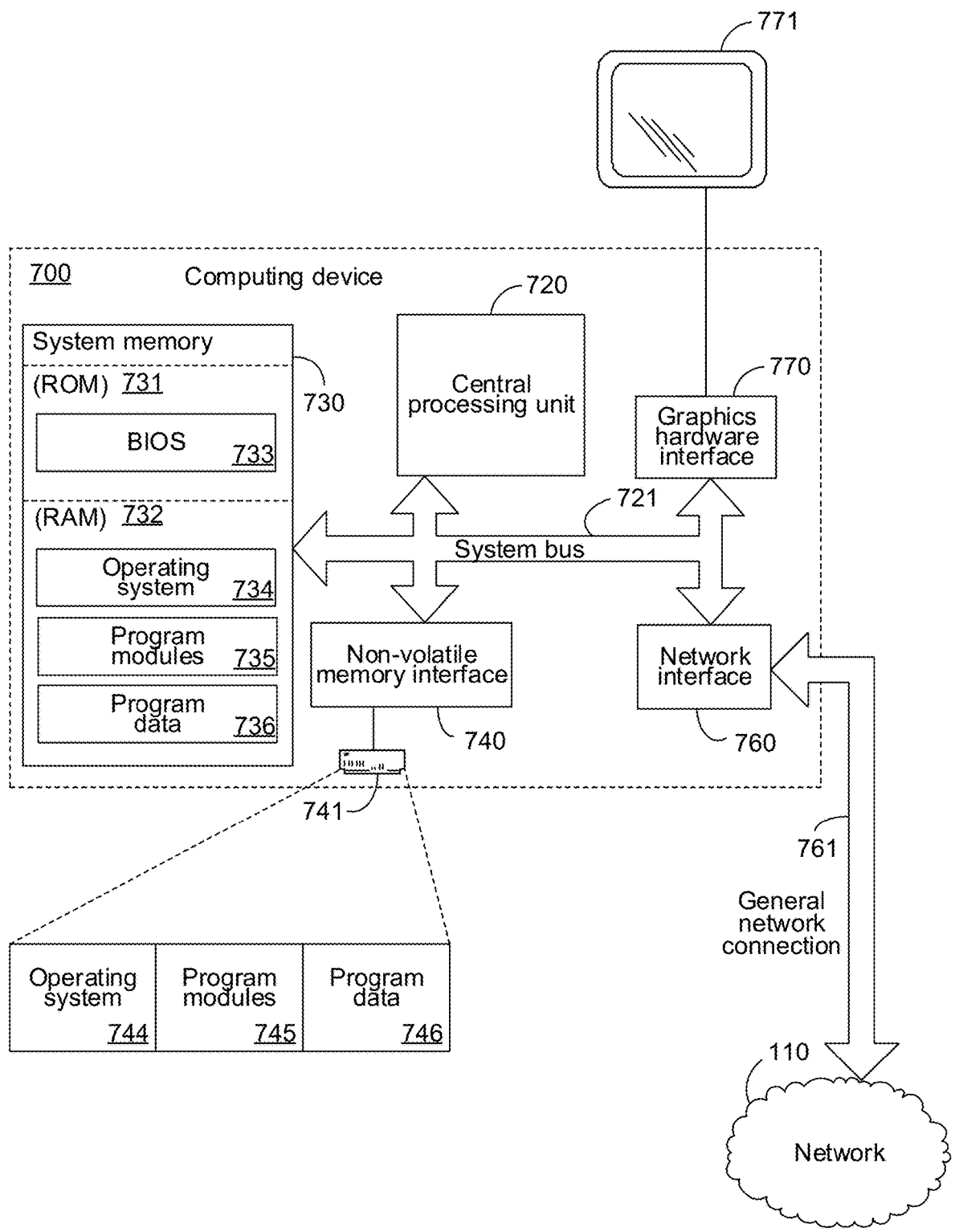
FIG. 7 is a block diagram of an exemplary computing device.

Turning to FIG. 7, an exemplary computing device 700 is illustrated which can perform some or all of the mechanisms and actions described above. The exemplary computing device 700 can include, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 770 and a display device 771, which can include display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which can include any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 636. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 761 through a network interface or adapter 760, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 761. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a set of one or more computing devices, in aggregate comprising: one or more processing units; and one or more computer-readable media comprising computer-executable instructions which, when executed by the one or more processing units, cause the set of computing devices to: encode, using an image model, an input image as an input image vector in a multidimensional vector space having a first dimensionality; utilize the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs; locate, from among the image vectors in the image vector database, a first set of closest (in the multidimensional space) image vectors to the input image vector; locate, from among the text vectors in the text vector database, a first set of closest (in the multidimensional space) text vectors to the input image vector; identify a first set of text-image pairs having images which were encoded into the located first set of closest image vectors; identify a second set of text-image pairs having text which was encoded into the located first set of closest text vectors; aggregate the first and second set of text-image pairs; and generate results responsive to the input image from at least a portion of the aggregated text-image pairs.

A second example is the set of computing devices of the first example, wherein the text-image pairs comprise images of physical objects and corresponding text that enumerates attributes of the physical objects; and wherein further the generated results responsive to the input image comprise generated text that enumerates attributes of a physical object visually depicted by the input image.

A third example is the set of computing devices of the second example, wherein the one or more computer-readable media comprise further computer-executable instructions, which, when executed by the one or more processing units, cause the set of computing devices to: identify attributes enumerated by text of the aggregated text-image pairs; vote for the attributes of the physical object visually depicted by the input image based on the identified attributes enumerated by the text of the aggregated text-image pairs, wherein votes are weighted based on similarity between a voted-for attribute and other identified attributes enumerated by the text of the aggregated text-image pairs; and select, based on the voting, the attributes of the physical object visually depicted by the input image.

A fourth example is the set of computing devices of the first example, wherein the image vector database further comprises image vectors obtained by encoding, using the image model, images independent of the text-image pairs.

A fifth example is the set of computing devices of the first example, wherein the text vector database further comprises text vectors obtained by encoding, using the text model, text independent of the text-image pairs.

A sixth example is the set of computing devices of the first example, wherein the one or more computer-readable media comprise further computer-executable instructions, which, when executed by the one or more processing units, cause the set of computing devices to: receive a new text-image pair comprising a new image and a new text corresponding to the new image; encode, using the image model, the new image as a new image vector in the multidimensional vector space; encode, using the text model, the new text as a new text vector in the multidimensional vector space; store the new image vector in the image vector database; and store the new text vector in the text vector database.

A seventh example is the set of computing devices of the sixth example, wherein the computer-executable instructions for encoding the new text as the new text vector comprise computer-executable instructions, which, when executed by the one or more processing units, cause the set of computing devices to: tokenize the new text into multi-character tokens, each multi-character token having a same quantity of characters.

An eighth example is the set of computing devices of the sixth example, wherein the computer-executable instructions for encoding the new text as the new text vector comprise computer-executable instructions, which, when executed by the one or more processing units, cause the set of computing devices to: generate a first intermediate vector from a first subset of the new text encompassed by a sliding window; slide the sliding window to encompass a subsequent subset of the new text, the sliding of the sliding window causing the subsequent subset to differ from the first subset in that the subsequent subset: (1) comprises subsequent text from the new text that was not part of the first subset but (2) lacks preliminary text from the new text that was part of the first subset; generate a subsequent intermediate vector from the subsequent subset; repeat the sliding of the sliding window through a remainder of the new text and the generating of the subsequent intermediate vector; and generate the new text vector from the first and subsequent intermediate vectors.

A ninth example is the set of computing devices of the first example, wherein the one or more computer-readable media comprise further computer-executable instructions, which, when executed by the one or more processing units, cause the set of computing devices to: determine parameters for at least one of the text model or the image model using training text-image pairs; wherein each training text-image pair comprises a training image and a training text pre-verified to correspond to the training image.

A tenth example is the set of computing devices of the ninth example, wherein the computer-executable instructions for determining the parameters for the at least one of the text model or the image model comprise computer-executable instructions, which, when executed by the one or more processing units, cause the set of computing devices to: encode, using the image model, the training images as training image vectors in the multidimensional vector space; encode, using a current version of the text model, the training text as current training text vectors in the multidimensional vector space; determine a current similarity, in the multidimensional vector space, between individual ones of the training image vectors and corresponding ones of the current training text vectors; generate an updated version of the text model utilizing updated parameters; encode, using the updated version of the text model, the training text as updated training text vectors in the multidimensional vector space; determine an updated similarity, in the multidimensional vector space, between individual ones of the training image vectors and corresponding ones of the updated training text vectors; conditionally retain the updated version of text model if the updated similarity is greater than the previously determined current similarity; and repeat the generating the updated version of the text model, the determining the updated similarity and the conditional retaining for other updated parameters.

An eleventh example is the set of computing devices of the tenth example, wherein the computer-executable instructions for determining the current similarity and the computer-executable instructions for determining the updated similarity comprise computer-executable instructions, which, when executed by the one or more processing units, cause the set of computing devices to determine a cosine similarity.

A twelfth example is the set of computing devices of the ninth example, wherein the parameters for the at least one of the text model or the image model comprise an initial hidden vector utilized in a bi-directional Long Short Term Memory (LSTM) neural network, the text model comprising the bi-directional LSTM neural network.

A thirteenth example is the set of computing devices of the ninth example, wherein the parameters for the at least one of the text model or the image model comprise a resampling utilized to remap an intermediate text vector of an intermediate dimensionality into the text vector of the first dimensionality.

A fourteenth example is a set of one or more computing devices, in aggregate comprising: one or more processing units; and one or more computer-readable media comprising computer-executable instructions which, when executed by the one or more processing units, cause the set of computing devices to: receive training text-image pairs, each comprising a training image and a training text pre-verified to correspond to the training image encode, using an image model, the training images as training image vectors in a multidimensional vector space having a first dimensionality; encode, using a current version of a text model, the training text as current training text vectors in the multidimensional vector space; determine a current similarity, in the multidimensional vector space, between individual ones of the training image vectors and corresponding ones of the current training text vectors; generate an updated version of the text model utilizing updated parameters; encode, using the updated version of the text model, the training text as updated training text vectors in the multidimensional vector space; determine an updated similarity, in the multidimensional vector space, between individual ones of the training image vectors and corresponding ones of the updated training text vectors; conditionally retain the updated version of text model if the updated similarity is greater than the previously determined current similarity; and repeat the generating the updated version of the text model, the determining the updated similarity and the conditional retaining for other updated parameters.

A fifteenth example is the set of computing devices of the fourteenth example, wherein the computer-executable instructions for determining the current similarity and the computer-executable instructions for determining the updated similarity comprise computer-executable instructions, which, when executed by the one or more processing units, cause the set of computing devices to determine a cosine similarity.

A sixteenth example is the set of computing devices of the fourteenth example, wherein the parameters for the at least one of the text model or the image model comprise an initial hidden vector utilized in a bi-directional Long Short Term Memory (LSTM) neural network, the text model comprising the bi-directional LSTM neural network.

A seventeenth example is the set of computing devices of the fourteenth example, wherein the parameters for the at least one of the text model or the image model comprise a resampling utilized to remap an intermediate text vector of an intermediate dimensionality into the text vector of the first dimensionality.

An eighteenth example is the set of computing devices of the fourteenth example, wherein the one or more computer-readable media comprise further computer-executable instructions, which, when executed by the one or more processing units, cause the set of computing devices to: encode, using the image model, an input image as an input image vector in the multidimensional vector space; utilize the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs; locate, from among the image vectors in the image vector database, a first set of closest (in the multidimensional space) image vectors to the input image vector; locate, from among the text vectors in the text vector database, a first set of closest (in the multidimensional space) text vectors to the input image vector; identify a first set of text-image pairs having images which were encoded into the located first set of closest image vectors; identify a second set of text-image pairs having text which was encoded into the located first set of closest text vectors; aggregate the first and second set of text-image pairs; and generate results responsive to the input image from at least a portion of the aggregated text-image pairs; wherein the text model was generated based on the repeating the generating the updated version of the text model, the determining the updated similarity and the conditional retaining for other updated parameters.

A nineteenth example is the set of computing devices of the eighteenth example, wherein the one or more computer-readable media comprise further computer-executable instructions, which, when executed by the one or more processing units, cause the set of computing devices to:

receive a new text-image pair comprising a new image and a new text corresponding to the new image; encode, using the image model, the new image as a new image vector in the multidimensional vector space; encode, using the text model, the new text as a new text vector in the multidimensional vector space; store the new image vector in the image vector database; and store the new text vector in the text vector database.

A twentieth example is a method of generating search results responsive to an input image, the method comprising: receiving, through a computer network communicational connection, from another computing device, the input image; encoding, using an image model, the input image as an input image vector in a multidimensional vector space having a first dimensionality; utilizing the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs; locating, from among the image vectors in the image vector database, a first set of closest (in the multidimensional space) image vectors to the input image vector; locating, from among the text vectors in the text vector database, a first set of closest (in the multidimensional space) text vectors to the input image vector; identifying a first set of text-image pairs having images which were encoded into the located first set of closest image vectors; identifying a second set of text-image pairs having text which was encoded into the located first set of closest text vectors; aggregating the first and second set of text-image pairs; generating the search results responsive to the input image from at least a portion of the aggregated text-image pairs; and transmitting, through the computer network communicational connection, to the other computing device, the search results in response to the receiving the input image.

As can be seen from the above descriptions, mechanisms for increasing the inclusiveness of results generated in response to an input image by searching tuned mappings of text and images as vectors in a single high-dimensional space have been presented. In view of the many possible variations of the subject matter described herein, we claim as our invention all such embodiments as may come within the scope of the following claims and equivalents thereto.

We claim:

1. A set of one or more computing devices, in aggregate comprising:
   one or more processing units; and
   one or more computer-readable media comprising computer-executable instructions which, when executed by the one or more processing units, cause the set of computing devices to:
      encode, using an image model, an input image as an input image vector in a multidimensional vector space having a first dimensionality;
      utilize the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs;
      locate, from among the image vectors in the image vector database, a first set of closest (in the multidimensional space) image vectors to the input image vector;
      locate, from among the text vectors in the text vector database, a first set of closest (in the multidimensional space) text vectors to the input image vector;
      identify a first set of text-image pairs having images which were encoded into the located first set of closest image vectors;
      identify a second set of text-image pairs having text which was encoded into the located first set of closest text vectors;
      aggregate the first and second set of text-image pairs; and
      generate results responsive to the input image from at least a portion of the aggregated text-image pairs.

2. The set of computing devices of claim 1, wherein the text-image pairs comprise images of physical objects and corresponding text that enumerates attributes of the physical objects; and wherein further the generated results responsive to the input image comprise generated text that enumerates attributes of a physical object visually depicted by the input image.

3. The set of computing devices of claim 2, wherein the one or more computer-readable media comprise further computer-executable instructions, which, when executed by the one or more processing units, cause the set of computing devices to:
   identify attributes enumerated by text of the aggregated text-image pairs;
   vote for the attributes of the physical object visually depicted by the input image based on the identified attributes enumerated by the text of the aggregated text-image pairs, wherein votes are weighted based on similarity between a voted-for attribute and other identified attributes enumerated by the text of the aggregated text-image pairs; and
   select, based on the voting, the attributes of the physical object visually depicted by the input image.

4. The set of computing devices of claim 1, wherein the image vector database further comprises image vectors obtained by encoding, using the image model, images independent of the text-image pairs.

5. The set of computing devices of claim 1, wherein the text vector database further comprises text vectors obtained by encoding, using the text model, text independent of the text-image pairs.

6. The set of computing devices of claim 1, wherein the one or more computer-readable media comprise further computer-executable instructions, which, when executed by the one or more processing units, cause the set of computing devices to:
   receive a new text-image pair comprising a new image and a new text corresponding to the new image;
   encode, using the image model, the new image as a new image vector in the multidimensional vector space;
   encode, using the text model, the new text as a new text vector in the multidimensional vector space;
   store the new image vector in the image vector database; and
   store the new text vector in the text vector database.

7. The set of computing devices of claim 6, wherein the computer-executable instructions for encoding the new text as the new text vector comprise computer-executable instructions, which, when executed by the one or more processing units, cause the set of computing devices to:
tokenize the new text into multi-character tokens, each multi-character token having a same quantity of characters.

8. The set of computing devices of claim 6, wherein the computer-executable instructions for encoding the new text as the new text vector comprise computer-executable instructions, which, when executed by the one or more processing units, cause the set of computing devices to:
generate a first intermediate vector from a first subset of the new text encompassed by a sliding window;
slide the sliding window to encompass a subsequent subset of the new text, the sliding of the sliding window causing the subsequent subset to differ from the first subset in that the subsequent subset: (1) comprises subsequent text from the new text that was not part of the first subset but (2) lacks preliminary text from the new text that was part of the first subset;
generate a subsequent intermediate vector from the subsequent subset;
repeat the sliding of the sliding window through a remainder of the new text and the generating of the subsequent intermediate vector; and
generate the new text vector from the first and subsequent intermediate vectors.

9. The set of computing devices of claim 1, wherein the one or more computer-readable media comprise further computer-executable instructions, which, when executed by the one or more processing units, cause the set of computing devices to:
determine parameters for at least one of the text model or the image model using training text-image pairs;
wherein each training text-image pair comprises a training image and a training text pre-verified to correspond to the training image.

10. The set of computing devices of claim 9, wherein the computer-executable instructions for determining the parameters for the at least one of the text model or the image model comprise computer-executable instructions, which, when executed by the one or more processing units, cause the set of computing devices to:
encode, using the image model, the training images as training image vectors in the multidimensional vector space;
encode, using a current version of the text model, the training text as current training text vectors in the multidimensional vector space;
determine a current similarity, in the multidimensional vector space, between individual ones of the training image vectors and corresponding ones of the current training text vectors;
generate an updated version of the text model utilizing updated parameters;
encode, using the updated version of the text model, the training text as updated training text vectors in the multidimensional vector space;
determine an updated similarity, in the multidimensional vector space, between individual ones of the training image vectors and corresponding ones of the updated training text vectors;
conditionally retain the updated version of text model if the updated similarity is greater than the previously determined current similarity; and
repeat the generating the updated version of the text model, the determining the updated similarity and the conditional retaining for other updated parameters.

11. The set of computing devices of claim 10, wherein the computer-executable instructions for determining the current similarity and the computer-executable instructions for determining the updated similarity comprise computer-executable instructions, which, when executed by the one or more processing units, cause the set of computing devices to determine a cosine similarity.

12. The set of computing devices of claim 9, wherein the parameters for the at least one of the text model or the image model comprise an initial hidden vector utilized in a bi-directional Long Short Term Memory (LSTM) neural network, the text model comprising the bi-directional LSTM neural network.

13. The set of computing devices of claim 9, wherein the parameters for the at least one of the text model or the image model comprise a resampling utilized to remap an intermediate text vector of an intermediate dimensionality into the text vector of the first dimensionality.

14. A set of one or more computing devices, in aggregate comprising:
one or more processing units; and
one or more computer-readable media comprising computer-executable instructions which, when executed by the one or more processing units, cause the set of computing devices to:
receive training text-image pairs, each comprising a training image and a training text pre-verified to correspond to the training image
encode, using an image model, the training images as training image vectors in a multidimensional vector space having a first dimensionality;
encode, using a current version of a text model, the training text as current training text vectors in the multidimensional vector space;
determine a current similarity, in the multidimensional vector space, between individual ones of the training image vectors and corresponding ones of the current training text vectors;
generate an updated version of the text model utilizing updated parameters;
encode, using the updated version of the text model, the training text as updated training text vectors in the multidimensional vector space;
determine an updated similarity, in the multidimensional vector space, between individual ones of the training image vectors and corresponding ones of the updated training text vectors;
conditionally retain the updated version of text model if the updated similarity is greater than the previously determined current similarity; and
repeat the generating the updated version of the text model, the determining the updated similarity and the conditional retaining for other updated parameters.

15. The set of computing devices of claim 14, wherein the computer-executable instructions for determining the current similarity and the computer-executable instructions for determining the updated similarity comprise computer-executable instructions, which, when executed by the one or more processing units, cause the set of computing devices to determine a cosine similarity.

16. The set of computing devices of claim 14, wherein the parameters for the at least one of the text model or the image model comprise an initial hidden vector utilized in a bi-directional Long Short Term Memory (LSTM) neural network, the text model comprising the bi-directional LSTM neural network.

17. The set of computing devices of claim 14, wherein the parameters for the at least one of the text model or the image model comprise a resampling utilized to remap an intermediate text vector of an intermediate dimensionality into the text vector of the first dimensionality.

18. The set of computing devices of claim 14, wherein the one or more computer-readable media comprise further computer-executable instructions, which, when executed by the one or more processing units, cause the set of computing devices to:
- encode, using the image model, an input image as an input image vector in the multidimensional vector space;
- utilize the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs;
- locate, from among the image vectors in the image vector database, a first set of closest (in the multidimensional space) image vectors to the input image vector;
- locate, from among the text vectors in the text vector database, a first set of closest (in the multidimensional space) text vectors to the input image vector;
- identify a first set of text-image pairs having images which were encoded into the located first set of closest image vectors;
- identify a second set of text-image pairs having text which was encoded into the located first set of closest text vectors;
- aggregate the first and second set of text-image pairs; and
- generate results responsive to the input image from at least a portion of the aggregated text-image pairs;
- wherein the text model was generated based on the repeating the generating the updated version of the text model, the determining the updated similarity and the conditional retaining for other updated parameters.

19. The set of computing devices of claim 18, wherein the one or more computer-readable media comprise further computer-executable instructions, which, when executed by the one or more processing units, cause the set of computing devices to:
- receive a new text-image pair comprising a new image and a new text corresponding to the new image;
- encode, using the image model, the new image as a new image vector in the multidimensional vector space;
- encode, using the text model, the new text as a new text vector in the multidimensional vector space;
- store the new image vector in the image vector database; and
- store the new text vector in the text vector database.

20. A method of generating search results responsive to an input image, the method comprising:
- receiving, through a computer network communicational connection, from another computing device, the input image;
- encoding, using an image model, the input image as an input image vector in a multidimensional vector space having a first dimensionality;
- utilizing the input image vector to search for closest vectors in both an image vector database and a separate text vector database, both comprising vectors in the same multidimensional vector space, wherein the image vector database comprises image vectors obtained by encoding images using the image model, the images being from text-image pairs, each text-image pair comprising an image and text corresponding to the image, and the text vector database comprises text vectors obtained by encoding text using a text model, the text also being from the text-image pairs;
- locating, from among the image vectors in the image vector database, a first set of closest (in the multidimensional space) image vectors to the input image vector;
- locating, from among the text vectors in the text vector database, a first set of closest (in the multidimensional space) text vectors to the input image vector;
- identifying a first set of text-image pairs having images which were encoded into the located first set of closest image vectors;
- identifying a second set of text-image pairs having text which was encoded into the located first set of closest text vectors;
- aggregating the first and second set of text-image pairs;
- generating the search results responsive to the input image from at least a portion of the aggregated text-image pairs; and
- transmitting, through the computer network communicational connection, to the other computing device, the search results in response to the receiving the input image.

* * * * *